United States Patent
Senda et al.

(10) Patent No.: US 7,917,276 B2
(45) Date of Patent: Mar. 29, 2011

(54) VEHICLE-USE POWER SUPPLY APPARATUS

(75) Inventors: Takashi Senda, Aichi-ken (JP); Keisuke Tani, Anjo (JP); Hiroaki Ono, Tokoname (JP)

(73) Assignee: Denso Corporation, Kariya (JP)

( * ) Notice: Subject to any disclaimer, the term of this patent is extended or adjusted under 35 U.S.C. 154(b) by 662 days.

(21) Appl. No.: 12/071,965

(22) Filed: Feb. 28, 2008

(65) Prior Publication Data

US 2008/0221755 A1  Sep. 11, 2008

(30) Foreign Application Priority Data

Mar. 9, 2007  (JP) .................................. 2007-060808

(51) Int. Cl.
*G06F 17/00* (2006.01)
*G06G 7/10* (2006.01)

(52) U.S. Cl. ........... 701/99; 701/22; 700/298; 290/40 B; 307/10.1

(58) Field of Classification Search ....................... 701/99
See application file for complete search history.

(56) References Cited

U.S. PATENT DOCUMENTS

| 6,927,500 | B2 * | 8/2005 | Iwanami et al. ............ 290/40 C |
| 7,355,292 | B2 * | 4/2008 | Yamashita .................. 290/40 C |
| 7,373,919 | B2 * | 5/2008 | Asada et al. .............. 123/339.18 |
| 2003/0036833 | A1 * | 2/2003 | Kobayashi ...................... 701/36 |
| 2004/0164616 | A1 | 8/2004 | Obayashi et al. |
| 2007/0198132 | A1 * | 8/2007 | Yamamoto et al. ......... 700/286 |

FOREIGN PATENT DOCUMENTS

| JP | 2003-061400 | | 2/2003 |
| JP | 2003061400 | A * | 2/2003 |
| JP | 2004-260908 | | 9/2004 |
| JP | 2005-012971 | | 1/2005 |

OTHER PUBLICATIONS

Japanese Office Action dated Nov. 18, 2008 issued in corresponding Japanese Application No. 2007-060808 with English Translation.

* cited by examiner

*Primary Examiner* — Thomas G Black
*Assistant Examiner* — Lin B Olsen
(74) *Attorney, Agent, or Firm* — Nixon & Vanderhye PC

(57) ABSTRACT

The vehicle-use power supply apparatus includes an alternator driven by an engine mounted on a vehicle to generate electric power in accordance with a command value, a battery electrically connected to the alternator to be charged by the alternator, and connected to electrical loads mounted on the vehicle to apply a power supply voltage to the electrical loads. The vehicle-use power supply apparatus further includes a first function of determining, as a power generation cost, an increase amount of fuel which the engine consumes for the alternator to generate electric power, and a second function of transmitting the command value to the alternator, the second function being configured to determine the command value on the basis of the power generation cost determined by the first function such that a change rate of the power supply voltage does not exceed a predetermined limit value.

3 Claims, 5 Drawing Sheets

VEHICLE-USE POWER SUPPLY APPARATUS

CROSS-REFERENCE TO RELATED APPLICATION

This application is related to Japanese Patent Application No. 2007-60808 filed on Mar. 9, 2007, the contents of which are hereby incorporated by reference.

BACKGROUND OF THE INVENTION

1. Field of the Invention

The present invention relates to a vehicle-use power supply apparatus including an alternator (generator) and a battery.

2. Description of Related Art

Generally, an alternator is mounted on a vehicle for the purpose of supplying electric power to various electrical loads provided in the vehicle, and charging a vehicle battery. The alternator is driven by a vehicle engine to generate electric power. It is desirable that the increase of fuel consumption of the engine due to driving the alternator is as small as possible.

To this end, there has been proposed a technique in which a fuel consumption per unit of generated power is calculated taking account of the efficiencies of a vehicle engine and an alternator, and a generation power of the alternator and a discharge of the battery are controlled using the calculated fuel consumption as a criterion of judgment. For example, refer to Japanese Patent Applications Laid-open No. 2004-260908, and No. 2005-12971. These patent documents disclose that a power generation amount is determined on the basis of a fuel consumption per unit of generated power, and power management is performed by use of a value of electric power or power generation torque as a command value.

There is known a vehicle provided with a regenerative braking apparatus that regenerates braking energy of the vehicle to drive an alternator. However, the required electric power of the vehicle cannot be covered only by the regenerated energy. Accordingly, also in such a vehicle provided with the regenerative braking apparatus, it is desired to suppress the increase of fuel consumption of the engine due to driving the alternator.

Incidentally, it is necessary to control a voltage supplied to electrical loads provided in a vehicle within a predetermined range depending on characteristics of the electrical loads, and also to control a voltage of a vehicle battery within a predetermined range. Accordingly, to use a value of electric power or power generation torque as a command value to perform the power management as disclosed in the above patent documents, a relationship between generated electric power and an output voltage of the alternator has to be precisely known in advance. This requires preparation of a high-precision battery model, or to obtain a precise input-output characteristic of the battery.

However, actually, neither of them is not easy. Particularly, in the case of a widespread lead-acid battery, these become more difficult, because the lead-acid battery has problems of polarization and electrode degradation. Hence, although using a value of electric power or power generation torque as a command value as disclosed in the above patent documents makes it possible to improve fuel consumption, it may cause an undesirable abrupt change of the voltage supplied to electrical loads, because the voltage cannot be precisely managed.

SUMMARY OF THE INVENTION

The present invention provides a vehicle-use power supply apparatus comprising:

an alternator driven by an engine mounted on a vehicle to generate electric power in accordance with a command value;

a battery electrically connected to the alternator to be charged by the alternator, and connected to electrical loads mounted on the vehicle to apply a power supply voltage to the electrical loads;

a first function of determining, as a power generation cost, an increase amount of fuel which the engine consumes for the alternator to generate electric power; and a second function of transmitting the command value to the alternator, the second function being configured to determine the command value on the basis of the power generation cost determined by the first function such that a change rate of the power supply voltage does not exceed a predetermined limit value.

According to the present invention, a vehicle-use power supply apparatus capable of improving fuel consumption, and accurately managing the battery voltage can be provided.

Other advantages and features of the invention will become apparent from the following description including the drawings and claims.

PREFERRED EMBODIMENTS OF THE INVENTION

Figure 1:
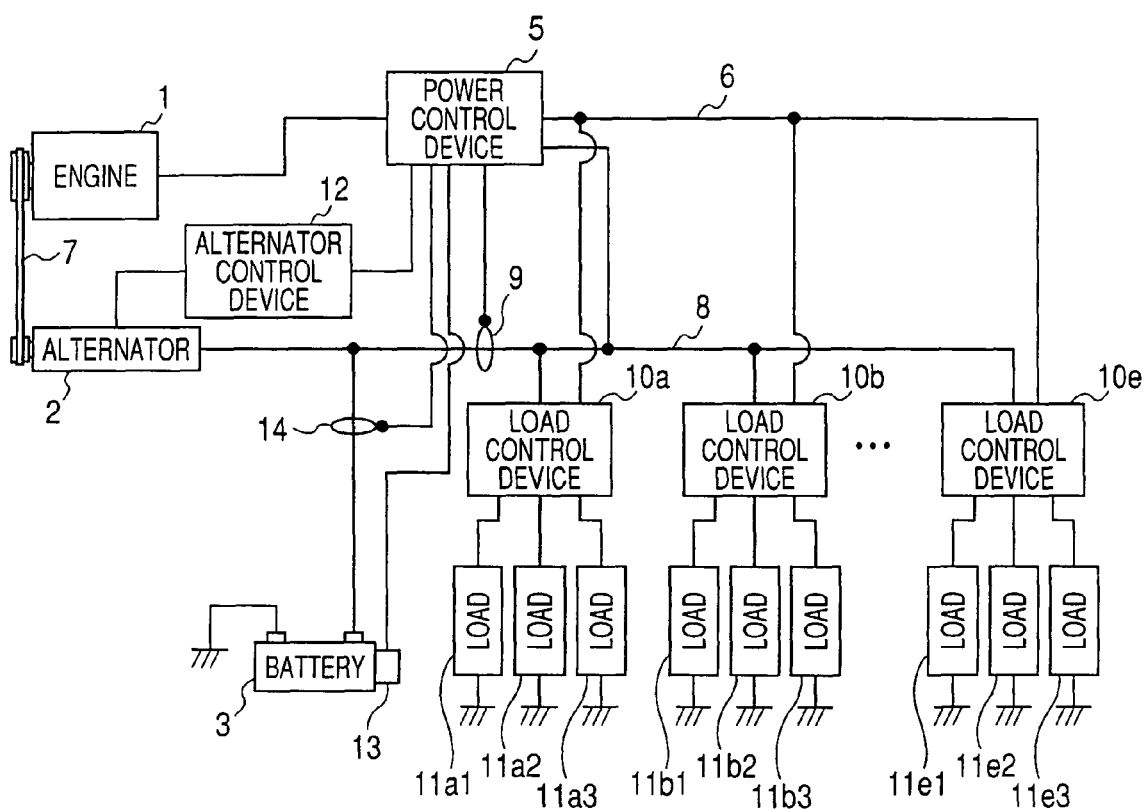
FIG. 1 a block diagram showing an electrical system of a vehicle provided with a vehicle-use power supply apparatus according to a first embodiment of the invention.

FIG. 1 is a block diagram showing an electrical system of a vehicle provided with a vehicle-use power supply apparatus according to a first embodiment of the invention.

As shown in this figure, an engine 1 is coupled to an alternator 2 having an IC regulator through a belt 7. The IC regulator operates to increase or reduce an excitation current supplied to a rotor coil wound around a rotor of the alternator 2 in order that a voltage of a battery 3 is kept at an appropriate value.

The rotor of the alternator 2 is driven to rotate by the rotation of a crankshaft of the engine 1 transmitted through the belt 7. The output voltage of the alternator 2 is controlled by the excitation current flowing through the rotor coil. The alternator 2 is connected to the battery 3 and load control devices 10a-10e through a power supply line 8. In this embodiment, the battery 3 is a lead-acid battery.

As shown in FIG. 1 between the alternator 2 and electrical loads 11a1-11a3, 11b1-11b3, . . . , 11e1-e3 (collectively referred to as electrical loads 11 hereinafter), and between the battery 3 and the electrical loads 11, there is not provided any device for keeping an output voltage thereof constant irrespective of an input voltage thereof (DC/DC converter, for example). Accordingly, the voltage supplied to the electrical loads 11 varies depending on the variation of the voltage of the battery 3, and the variation of the output voltage of the alternator 2.

The load control device 10a performs a power supply control for the electrical loads 11a1-11a3, the load control device 10b performs a power supply control for the electrical loads 11b1-11b3, and the load control device 10e performs a power supply control for the electrical loads 11e-11e3. Each of the load control devices 10a-10e, which includes various switches and sensors (not shown) needed for the power supply control, performs output control of the electrical loads belonging thereto in accordance with external signals and outputs of these sensors.

A power supply control device 5 monitors the states of the alternator 2, battery 3, and power supply line 8, in order to control the alternator 2 through an alternator control device 12.

The alternator control device 12 transmits alternator information including a current generation power and a current rotational speed of the alternator 2 to the power supply control device 5. The power supply control device 5 is connected with a battery current sensor 14, a load current sensor 9, and a battery temperature sensor 13, in order to obtain an input/output current of the battery 3, a load current, and a temperature of the battery 3. The power supply control device 5 also receives a battery voltage (the output voltage of the battery 3) and a bus voltage (the voltage of the power supply line 8 as a power supply voltage).

The power supply control device 5 is connected to the load control devices 10a-10e through a multiple signal transmission line 6 in order to exchange information with the load control devices 10a-10e by multiplex communication. The alternator control device 12 receives vehicle braking information from a not-shown vehicle controller, and performs a regenerative braking by increasing the excitation current of the alternator 2 in order to generate a necessary vehicle braking amount (regenerative braking amount) indicated by the received vehicle braking information.

The vehicle controller computes the vehicle braking amount on the basis of a manipulation amount of a braking manipulation means, for example, an output of a brake pedal depression amount sensor, and commands a controller of a not-shown hydraulic braking apparatus to generate a braking amount equal to the computed braking amount less the above regenerative braking amount.

Figure 2:
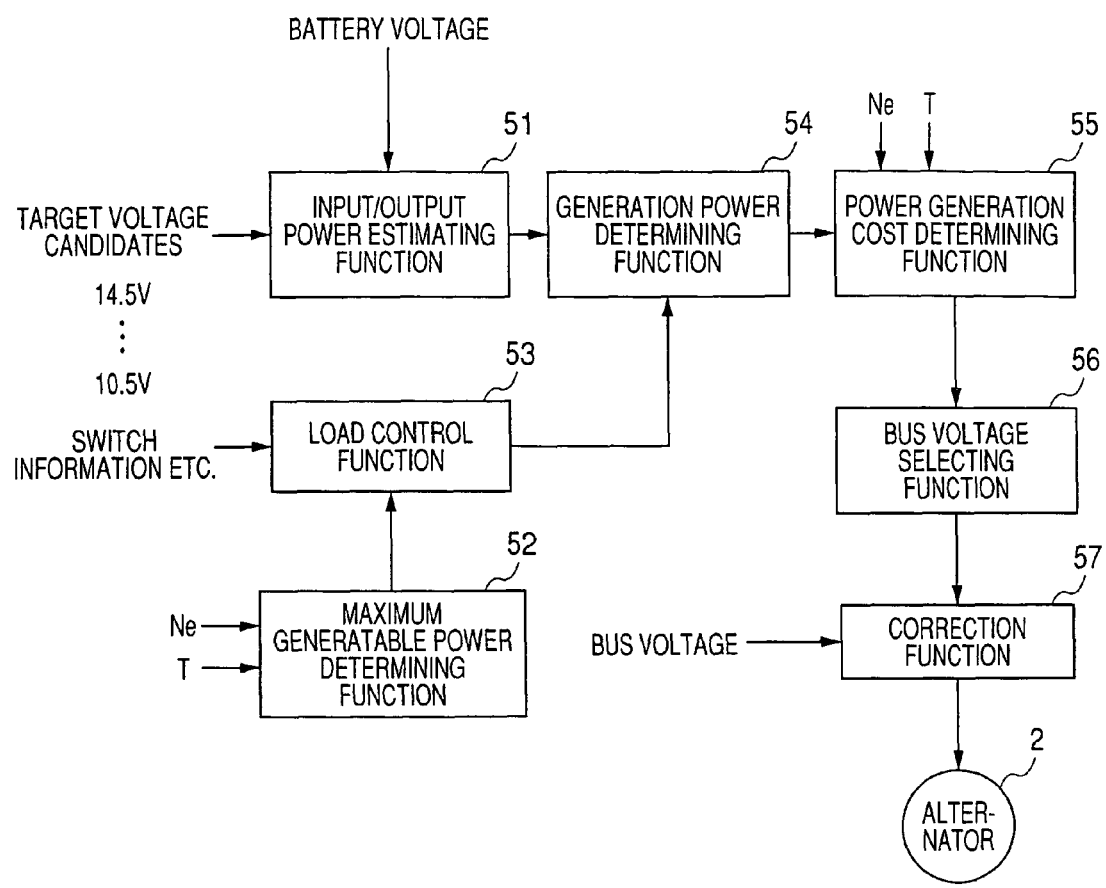
FIG. 2 is a block diagram showing a control which a power supply control device included in the vehicle-use power supply apparatus performs to control an alternator.

Next, control of the alternator 2 by the power supply control device 5 will be explained. The power supply control device 5 is a computer including therein a CPU, a ROM, and a RAM. The CPU executes programs stored in the ROM utilizing the RAM as a primary memory in order to implement the various functions shown in FIG. 2.

An input/output power estimating function 51 inputs a plurality of predetermined target voltage candidates (to be explained below) and the current voltage of the battery 3 (battery voltage) into a pre-set simple battery model in order to determine a power to be inputted to or outputted from the battery 3 as an estimated input/output power for each of the target voltage candidates.

The upper and lower ones of the target voltage candidates are predetermined such that the battery voltage is within a normal voltage range within which the electrical loads 11 can operate normally. The other target voltage candidates are determined by dividing the difference value between the upper target voltage candidate and the lower target voltage candidate by a predetermined factor, or into even intervals.

Figure 3:
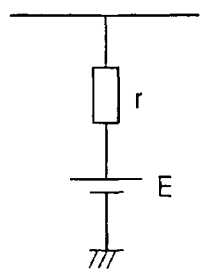
FIG. 3 is a diagram showing a simple battery model used by an input/output estimating function included in the control shown in FIG. 2.

FIG. 3 is a diagram showing the simple battery model mentioned above. As shown in FIG. 3, the simple battery model is constituted by an electromotive force component E and an internal resistance component r. Here, assuming that the target voltage candidate is 14 V, the electromotive force is 12 V, and the internal resistance is 1Ω, the battery voltage becomes 14 V when a current flowing through the internal resistance component is 2 A. Accordingly, in this assumption, the battery 3 need to be supplied with electric power of 2 A×14 V=28 W.

Since the electromotive force and the internal resistance of the battery 3 changes with time, or depending on usage conditions (charging/discharging frequency), the values of the electromotive force and the internal resistance are updated periodically. To perform this update, the battery voltage and the battery current are monitored, and a relationship between the battery voltage and the battery current is approximated by a straight line. The intercept of the linear curve is determined as the electromotive force, and the slope of the linear curve is determined as the internal resistance.

A maximum generatable power determining function 52 obtains an actual rotation speed of the engine (referred to as actual engine speed hereinafter) Ne, computes an engine torque from this actual engine speed Ne, and computes a current driving torque T of the vehicle on the basis of an accelerator opening degree and a vehicle speed using a predetermined driving torque computing equation. The maximum generatable power determining function 52 calculates a value of the engine torque less the driving torque T as a value of a torque which the engine 1 can supply to the alternator 2 (this torque being referred to as "suppliable torque" hereinafter). The maximum generatable power determining function 52 further calculates electric power which the alternator 2 generates in a case where the calculated suppliable torque is supplied to the alternator 2, and the calculated electric power is determined as a maximum generatable power of the alternator 2.

A load control function 53, which serves also as a power consumption calculation function, obtains operating state information including switched state information of the electrical loads 11, and calculates a current total power consumption of the electrical loads 11 on the basis of the operating state information. The load control function 53 further calculates electric power which the battery 3 can supply to the electrical loads 11 on the basis of the current battery voltage (this calculated electric power being referred to as "maximum suppliable power" hereinafter), and calculates a sum of this maximum suppliable power and the maximum generatable power calculated by the maximum generatable power determining function 52 as a maximum power which is suppliable to the electrical loads 11. And the load control function 53 controls at least one of the generation power and the total power consumption such that the total power consumption is below the calculated maximum power suppliable to the electrical loads 11.

A generation power determining function 54 determines a generation power which the generator 2 needs to generate for each of the target voltage candidates in accordance with the estimated input/output power of the battery 3 determined by the input/output power estimating function 51 for each of the target voltage candidates, and the total power consumption calculated by the load control function 53. If it is defined that the estimated input/output power has a positive sign when the battery 3 is charged (supplied with power), and has a negative sign when the battery 3 is discharged (supplies power), the generation power equals the sum of the estimated input/output power and the total power consumption.

A power generation cost determining function 55 determines a power generation cost for the generation power determined by the generation power determining function 54 for each of the target voltage candidates. The power generation cost is a ratio of an increase amount of fuel needed to generate power versus this power. Accordingly, if the power generation cost is low, it means that the same amount of power can be generated by a small increase amount of fuel.

Figure 4:
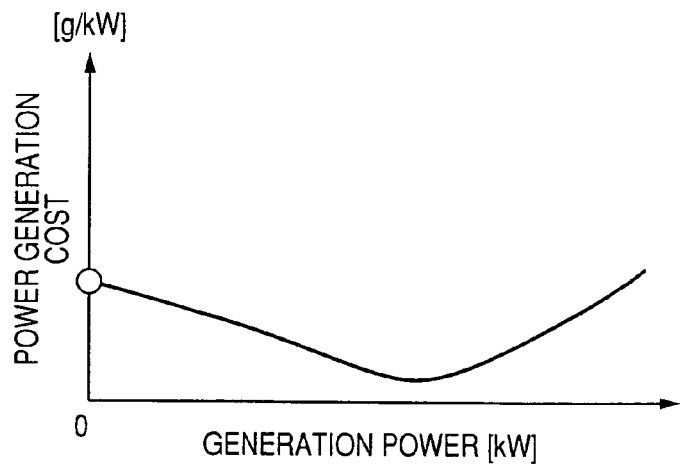
FIG. 4 is a diagram showing an example of a relationship between electric generation power and a power generation cost.

FIG. 4 is a diagram showing an example of the relationship between the electric generation power (kW) and the power generation cost. As shown in FIG. 4, the power generation cost varies depending on the generation power. That is because an operation point of the engine and the efficiency of the alternator vary depending on the generation power. The power generation cost varies also depending on the engine speed and driving torque of the vehicle. Accordingly, the above relationship is pre-set for each of a plurality of different engine speed/driving torque ranges, and one of a plurality of the different relationships is selected in accordance with the current actual engine speed Ne and the current actual driving torque T.

A bus voltage selecting function 56, which serves also as a target value setting function, selects an optimum one of the target voltage candidates on the basis of predetermined optimum candidate selecting conditions. The optimum candidate selecting conditions include a condition of the power generation cost. For example, the bus voltage selecting function 56 selects, as a voltage command value, one of the target voltage candidates, which corresponds to a minimum one of the power generation costs which the power generation cost determining function 55 has determined for each of the target voltage candidates. However, in case the remaining capacity of the battery 3 falls below a predetermined value, in order to ensure a lowest permissible remaining power of the battery 3, a different condition to increase power inputted into the battery 3 may be added in addition to the condition of the power generation cost.

A correction function 57 successively obtains the current bus voltage, calculates a difference in absolute value between the obtained bus voltage and the voltage command value selected by the bus voltage selecting function 56, and determines whether or not this difference is equal to or smaller than a predetermined allowable voltage variation. If the calculated difference is equal to or smaller than the predetermined allowable voltage variation, the correction function 57 outputs the voltage command value selected by the bus voltage selecting function 56 to the alternator 2 as it is. On the other hand, if the calculated difference is larger than the predetermined allowable voltage variation, the correction function 57 outputs a value of the bus voltage which has been brought near the side of the voltage command value by a value that makes the difference not larger than the predetermined allowable voltage variation.

The alternator 2 controls the generation power by use of the IC regulator in order that the bus voltage becomes equal to the voltage command value as soon as possible. Accordingly, as the difference between the actual bus voltage and the voltage command value increases, a change rate of the bus voltage becomes fast. However, in this embodiment, the difference between the voltage command value and the current bus voltage is limited below the voltage command value as explained above. Accordingly, the change rate of the bus voltage is restricted.

Therefore, a maximum value of the change rate of the bus voltage can be controlled by the value of the allowable voltage variation. For example, by setting the allowable voltage variation to a small value, the change rate of the bus voltage can be made slow. In this embodiment, the allowable voltage variation is determined such that the maximum change rate does not exceed a value allowable for the electrical loads 11. This makes it possible to prevent the brightness of a lamp as one of the electrical loads from changing abruptly, causing concern to the driver or passengers of the vehicle.

In addition, in this embodiment, one of a plurality of the target voltage candidates is selected as the voltage command value in view of the power generation cost. That is, the voltage command value is determined in view of the power generation cost. This makes it possible to improve fuel consumption.

Furthermore, the battery model (FIG. 3) of the battery 3 used to determine the estimated input/output power is not a precise one but a simplified one. This makes it possible to reduce the calculation load.

Next, a second embodiment of the invention is described. The second embodiment is so configured that the power supply control device 5 implements various functions shown in FIG. 5 instead of the functions shown in FIG. 2. As for the rest, the second embodiment is the same as the first embodiment.

Figure 5:
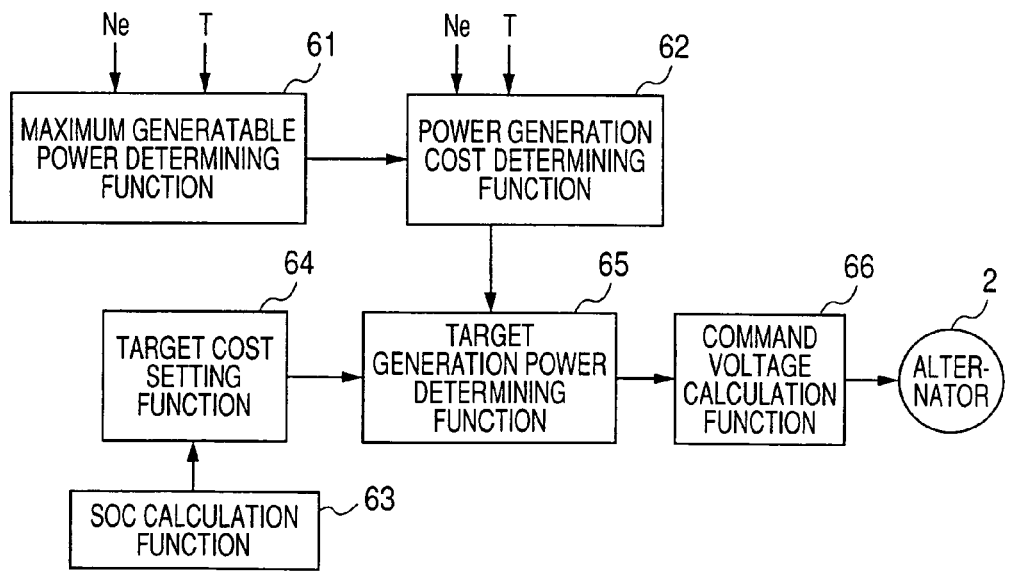
FIG. 5 is a block diagram showing a control which a power supply control device included in a vehicle-use power supply apparatus according to a second embodiment of the invention performs to control an alternator.
Figure 6:
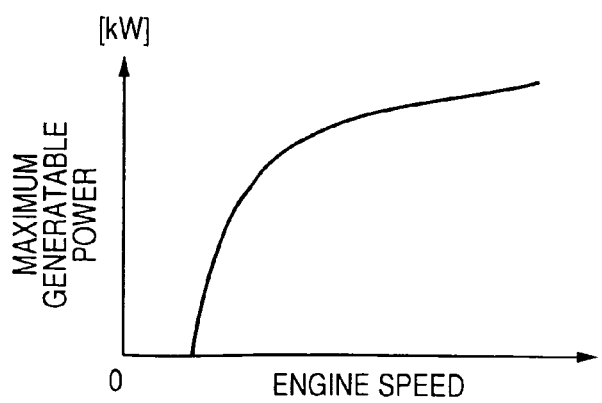
FIG. 6 is a diagram showing an example of a relationship between an engine speed and a maximum generatable power of an alternator.

A maximum generatable power determining function 61 shown in FIG. 5 determines a current maximum generatable power of the alternator 2 in the similar manner as the maximum generatable power determining function 52 in the first embodiment. FIG. 6 is a diagram showing an example of a relationship between the engine speed and the maximum generatable power. As shown in this figure, the maximum generatable power increases with the increase of the engine speed.

A power generation cost determining function 62 sets a plurality of generation power candidates such that the maximum generatable power determined by the maximum generatable power determining function 61 is the maximum one of these generation power candidates. Also, the power generation cost determining function 62 determines a power generation cost for each of the generation power candidates. In this embodiment, these generation power candidates are determined such that they are equi-distanced within a predetermined range below the maximum generatable power.

Figure 7:
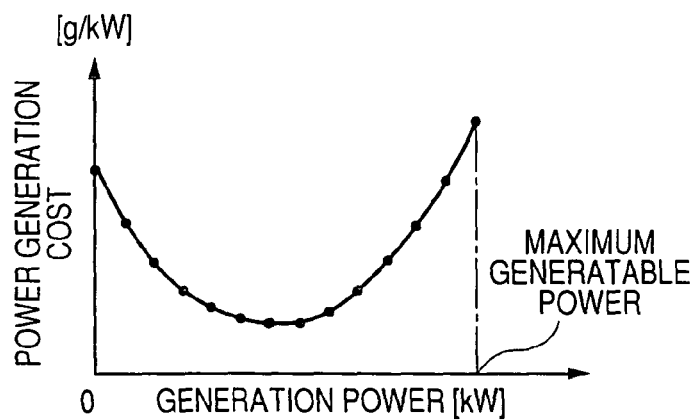
FIG. 7 is a diagram graphically showing an example of a relationship between a power generation cost and a corresponding power candidate.

Next, a method of determining the power generation cost for each of the generation power candidates will be explained. First, the engine speed Ne and the driving torque T of the vehicle when no electric power is generated are obtained or computed. Subsequently, an increase of the engine torque and an increase of fuel consumption necessary to generate electric power are calculated for each of the generation power candidates on the premise of the driving torque T. The power generation cost of each generation power candidate is calculated by dividing the corresponding calculated increase of the fuel consumption by the corresponding generation power candidate. FIG. 7 is a diagram graphically showing the power generation cost (black circles in FIG. 7) calculated for each of generation power candidates.

Instead of the above described configuration in which the power generation cost is determined for each of the generation power candidates, there may be employed such a configuration in which the relationship between the power generation cost and the generation power is stored for each different engine speed/driving torque ranges, and of these different relationships, an appropriate one is selected in accordance with the current engine speed Ne and the current actual driving torque T, in the similar manner as the power generation cost determining function 55 in the first embodiment. In this case, the maximum generatable power determining function 61 determines a maximum value of the generation power axis in the selected relationship as the maximum generatable power.

An SOC calculation function 63 integrates a charge/discharge amount of the battery 3, and successively calculates a charge ratio of the battery 3 (referred to as "SOC" hereinafter) by dividing the full-charge capacity of the battery 3 less the integrated charge/discharge amount, by a full-charge capacity of the battery 3. The full-charge capacity may be a rated capacity of the battery 3.

Figure 8:
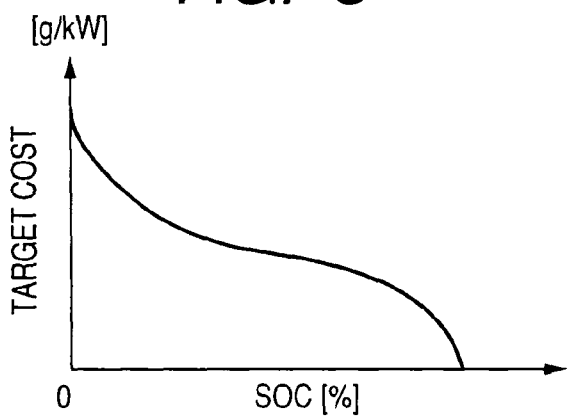
FIG. 8 is a diagram showing an example of a pre-set relationship between SOC of a battery and a target cost.

A target cost setting function 64 determines a target cost which is a target value of the power generation cost on the basis of the SOC calculated by the SOC calculation function 63, by using a pre-set relationship between the SOC and the target cost. FIG. 8 is a diagram showing an example of the relationship. As seen from FIG. 8, the target cost decreases with the increase of the SOC. That is, when the SOC is low, the target cost is high. That is because, the need to charge the battery 3 becomes high as the SOC decreases.

The relationship used by the target cost setting function 64 is irrelevant to the state of the vehicle in this embodiment. However, it may be varied depending on the state of the vehicle, such as the electric power consumption of the electrical loads 11. For example, for the same SOC, the target cost may be set higher when the electric power consumption of the electrical loads 11 is high than when it is low. This makes it possible to prevent the SOC from excessively decreasing when the electric power consumption is large, because a target generation power Power_SV determined by a target generation power determining function 65 (to be explained below) becomes larger. Although the relationship between the target cost and the SOC is represented by a monotone decreasing curve as shown in FIG. 8, it may be represented by a straight line.

Figure 9:
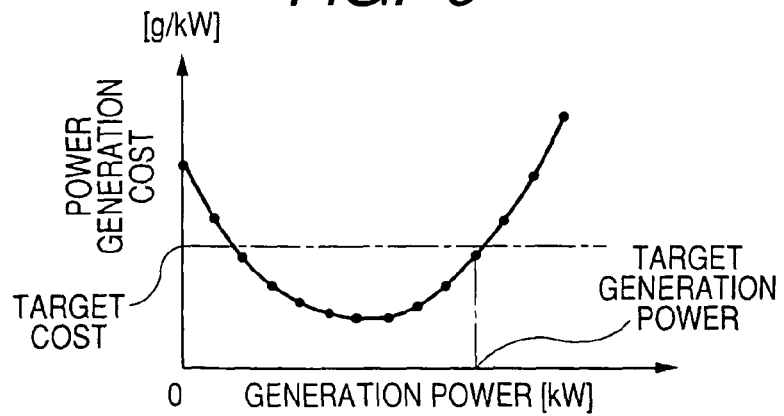
FIG. 9 is a diagram showing the graph of FIG. 7 with a line representing the target cost added.

The target generation power determining function 65 selects, of the power generation candidates set by the power generation cost determining function 62, the ones which are lower than the target cost determined by the target cost setting function 64. FIG. 9 shows the graph of FIG. 7 added with a line representing the target cost determined by the relationship shown in FIG. 8.
In the example of FIG. 9, the black circles below this line represent the power generation candidates selected by the target generation power determining function 65. Of these selected power generation candidates, the largest one is determined as the target generation power Power_SV. In the example of FIG. 9, of the black circles below the line representing the target cost, the rightmost one is determined as representing the target generation power Power_SV.

A command voltage calculation function 66, which serves as a command value setting function, successively updates the voltage command value sent to the alternator 2 at predetermined intervals. To update the voltage command value, a comparison is made between the target generation power Power_SV determined by the target generation power determining function 65 and an actual generation power of the alternator 2 (referred to as "alternator actual generation power Power_Alt" hereinafter). Thereafter, the voltage command value is changed by a value not exceeding a predetermined command voltage change rate limit value Vss in a direction that the alternator actual generation power Power_Alt approaches the target generation power Power_SV.

Figure 10:
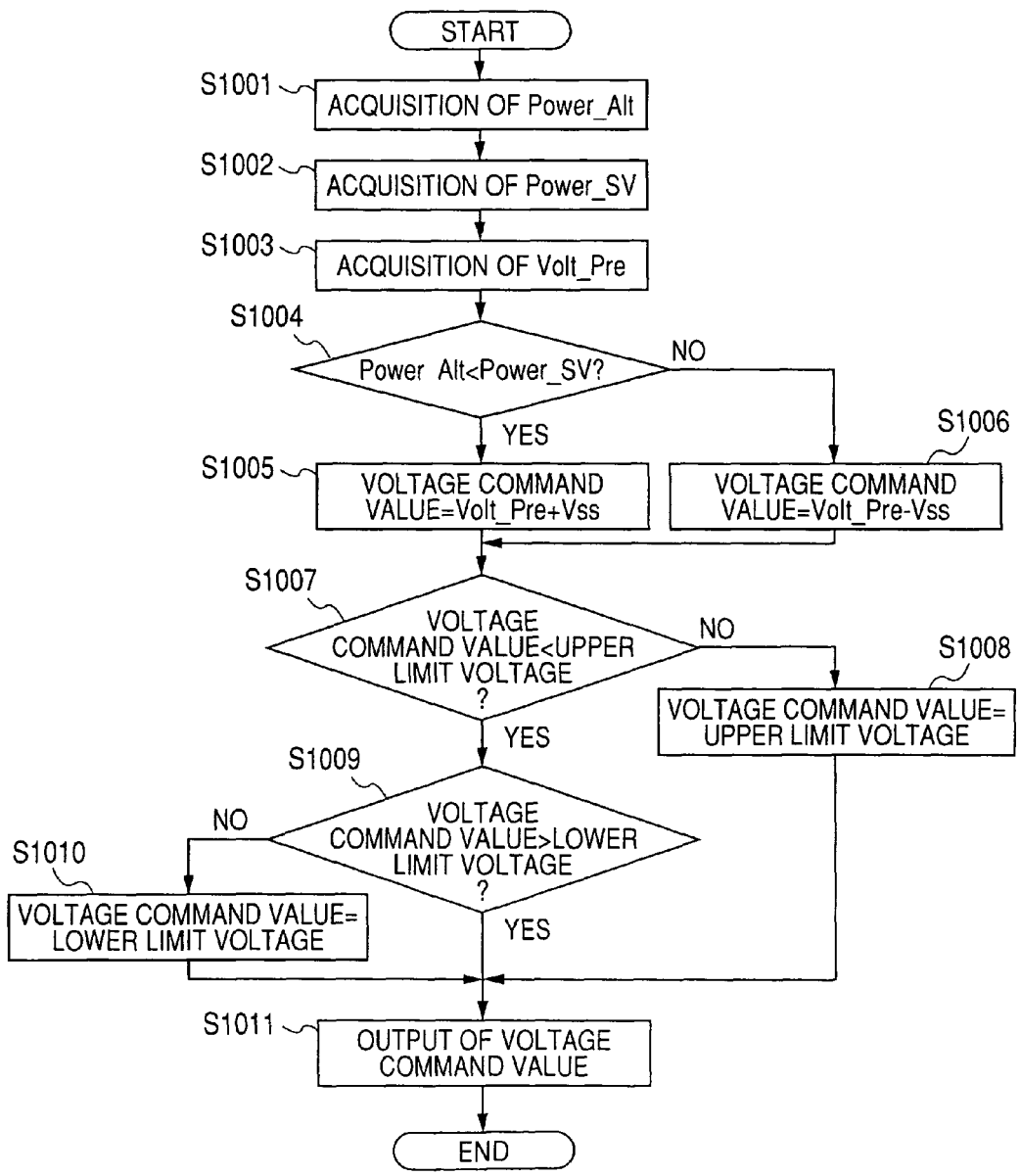
FIG. 10 is a flowchart showing details of a process performed by a command voltage calculation function included in the control shown in FIG. 5.

FIG. 10 is a flowchart showing details of this process performed by the command voltage calculation function 66. This process begins by acquiring the alternator actual generation power Power_Alt" at step S1001. The alternator actual generation power Power_Alt can be acquired by obtaining the excitation current and the rotation speed of the alternator 2, and by referring to a known relationship among the alternator actual generation power, excitation current, and rotation speed of the alternator 2. Alternatively, the alternator actual generation power Power_Alt may be obtained as a product of the voltage and current of the power supply line 8.

At step S1002, the target generation power Power_SV determined by the target generation power determining function 65 is acquired. At step S1003, a previous voltage command value Volt_Pre is acquired.

At step S1004, it is determined whether or not the alternator actual generation power Power_Alt acquired at step S1001 is smaller than the target generation power Power_SV acquired at step S1002. If this determination result is affirmative, the process proceeds to step S1005 where a value of the previous voltage command value Volt_Pre acquired at step S1003 added with the command voltage change rate limit value Vss is set as the voltage command value. The command voltage change rate limit value Vss, which corresponds to the allowable voltage variation, is a constant value predetermined in view of an allowable voltage change rate ensuring normal operations of the electrical loads 11.

On the other hand, if the determination result at step S1004 is negative, the process proceeds to step S1006 where a value of the previous voltage command value Volt_Pre acquired at step S1003 less the command voltage change rate limit value Vss is set as the voltage command value.

After setting the voltage command value at step S1005 or step S1006, the process proceeds to step S1007 where it is determined whether or not the voltage command value is smaller than a pre-set upper limit voltage. This upper limit voltage is set to a value to ensure the electrical loads 11 to operate normally.

If the determination result at step S1007 is negative, the process proceeds to step S1008 where the voltage command value is set as the upper limit voltage, and then proceeds to step S1011. On the other hand, if the determination result at step S1007 is affirmative, the process proceeds to step S1009 where it is determined whether or not the voltage command value is larger than a pre-set lower limit voltage. This lower limit voltage is set to a value to ensure the electrical loads 11 to operate normally.

If the determination result at step S1009 is affirmative, it means that the voltage command value set at step S1005 or S1006 is within a range between the upper limit voltage and the lower limit voltage. In this case, the process directly proceeds to step S1011. On the other hand, if the determination result at step S1009 is negative, the process proceeds to step S1010 to set the voltage command value as the lower limit voltage, and then proceeds to step S1011. At step S1011, the set voltage command value is outputted to the alternator 2.

In the above described second embodiment, a plurality of the generation power candidates are prepared, and the target generation power Power_SV is determined on the basis of the power generation cost calculated for each of the generation power candidates. And since the voltage command value is set on the basis of the target generation power Power_SV, fuel consumption can be improved. Furthermore, since the change rate of the voltage command value is set to the command voltage change rate limit value Vss which is determined in view of the voltage change rate allowable to ensure the electrical loads 11 to operate normally, it is possible to prevent the battery voltage from changing abruptly.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-use power supply apparatus comprising:
    an alternator driven by an engine mounted on a vehicle to generate electric power in accordance with a command value;
    a battery electrically connected to said alternator to be charged by said alternator, and connected to electrical loads mounted on said vehicle to apply a power supply voltage to said electrical loads;
    a first function of determining, as a power generation cost, an increase amount of fuel which said engine consumes for said alternator to generate electric power; and
    a second function of transmitting said command value to said alternator, said second function being configured to determine said command value on the basis of said power generation cost determined by said first function such that a change rate of said power supply voltage does not exceed a predetermined limit value.

2. The vehicle-use power supply apparatus according to claim 1, further comprising:
    a third function of estimating, for each of predetermined target voltage candidates, an input/output power to be inputted to or outputted from said battery to make said power supply voltage equal to said each of said predetermined target voltage candidates on the basis of a current value of said power supply voltage, and a pre-set battery model; and
    a fourth function of calculating a total power consumption of said electrical loads; and
    a fifth function of determining, for each of said predetermined target voltage candidates, a generation power of said alternator on the basis of said input/output power estimated by said third function for each of said predetermined target voltage candidates, and said total power consumption calculated by said fourth function;
    said first function being configured to determine, for each of predetermined target voltage candidates, said power generation cost on the basis of a pre-set relationship between generation power of said alternator versus power generation cost,
    said second function including a sixth function of setting one of said predetermined voltage candidates as said command value, said one being selected on the basis of said power generation cost determined by said second function for each of said voltage candidates, and a seventh function of correcting said command value set by said sixth function such that a difference between said command value and a current value of said power supply voltage becomes equal to or smaller than a predetermined allowable value.

3. The vehicle-use power supply apparatus according to claim 1, further comprising:
    a third function of determining a possible maximum of a value concerning generation power of said alternator; and
    a fourth function of selecting a target cost from among said power generation cost on the bias of a charge rate of said battery;
    said first function being configured to set a plurality of candidates of said value concerning generation power of said alternator such that said possible maximum is a maximum of said plurality of said candidates, and determine said power generation cost for each of said plurality of said candidates,
    said vehicle-use power supply apparatus further comprising a fifth function of determining, as a target generation power of said alternator, a maximum one of said plurality of said candidates whose power generation cost are lower than said target cost set by said fourth function,
    said second function being configured to perform a comparison between said target generation power and a current generation power of said alternator, and change said command value in a direction that said current generation power approaches said target generation power by a value not exceeding a predetermined allowable voltage variation.

* * * * *